United States Patent [19]

Shone et al.

[11] Patent Number: 4,501,124
[45] Date of Patent: Feb. 26, 1985

[54] APPARATUS FOR LEAKAGE DETECTION OF CRYOGENIC MATERIALS

[75] Inventors: Edward B. Shone; Robert W. Wilson; Gordon L. Cunningham, all of Chester, England

[73] Assignee: Shell Oil Company, Houston, Tex.

[21] Appl. No.: 571,146

[22] Filed: Jan. 17, 1984

Related U.S. Application Data

[63] Continuation of Ser. No. 458,685, Jan. 17, 1983, abandoned.

[30] Foreign Application Priority Data

Sep. 18, 1980 [GB] United Kingdom ............... 8030160

[51] Int. Cl.³ .................................. G01K 13/00
[52] U.S. Cl. .................. 62/129; 73/40.5 R; 165/11 R; 236/94; 340/585; 340/626
[58] Field of Search ............ 73/40.5 R, 49.1; 62/55, 62/125, 129, 383; 236/94; 165/11 R; 340/585, 605, 626; 116/216, 221

[56] References Cited

U.S. PATENT DOCUMENTS

| 3,253,572 | 5/1966 | Lindberg | 116/216 |
| 3,645,443 | 2/1972 | Willson et al. | 236/34 |
| 3,874,222 | 4/1975 | Ladd et al. | 73/40.5 R |
| 4,019,925 | 4/1977 | Nenno et al. | 148/2 |
| 4,087,971 | 5/1978 | Hart | 60/527 |

FOREIGN PATENT DOCUMENTS 1033434 12/1954 Fed. Rep. of Germany ...... 340/622

Primary Examiner—William E. Tapolcai

[57] ABSTRACT

A device for detecting leaks of cryogenic materials from a structure, said device comprising a heat-conductive element which can be brought into contact with the cryogenic material-containing structure, and a shape memory effect element capable of effecting a displacement according to the cryogenic temperature to which the element is subjected.

1 Claim, 2 Drawing Figures

APPARATUS FOR LEAKAGE DETECTION OF CRYOGENIC MATERIALS

This is a continuation of application Ser. No. 458,685, filed Jan. 17, 1983, now abandoned.

BACKGROUND OF THE INVENTION

Presently many cryogenic materials are known and are widely used. For example, the role of liquid gases such as liquefied natural gas (LNG) and liquefied petroleum gas (LPG) has become very important. Other examples of important cryogenic materials are liquefied oxygen, ethylene, butane, etc. Suitable structures have been developed, which are adapted to contain and to transport cryogenic materials, e.g., LNG tankers.

It will be clear that certain measures such as insulation should be taken to maintain the cryogenic materials at the desired temperature. Several insulation systems have already been developed.

It can be understood that if a fault such as a crack developed in the insulation system of the structure containing the cryogenic material, the cold from the said material would leak through the fault. So, the area in contact with the fault would become chilled. This could lead to catastophic failure of the structure as a whole and to dangerous spillage.

To avoid these dangers it is very desirable to be informed about leakage as soon as a leak would occur.

Normal methods employed to detect such cold spots, which are present if a leak would occur, involve either the visual inspection of the cryogenic material-containing structure for ice formation or the attachment of temperature measuring means, such as thermocouples to the surface of the said structure and the determination of temperature changes detected. The former method is time-consuming and can be both difficult and unpleasant, while the latter is expensive to install and maintain. The demerits of the above methods are increased greatly, when extended to structures such as tanks as employed in the large bulk liquid gas marine tankers of the present day and will be even further increased when projected designs for still larger vessels are brought to completion.

So there exists a large need for a device which should be easily applied or removed from the structure containing the said cryogenic materials and which should be able to work in areas of maximum safety requirements. Further, no electrical connections should be used to avoid danger of ignition.

SUMMARY OF THE INVENTION

The present invention relates to an apparatus for leakage detection of cryogenic materials, being present in a structure, which is adapted to contain said materials.

It is therefore an object of the present invention to provide a simple, generally fool-proof and safe device to obtain information about cryogenic leaks. Such a device may for example be used to detect leakage in pipes (in particular under couplings), valves, tank couplings, etc.

The invention therefore comprises a device for detecting leaks of cryogenic materials being present in a structure, which is adapted to contain said cryogenic materials, said device comprising a heat-conductive element, which can be brought into contact with the cryogenic material-containing structure, and comprising a SME element giving a displacement according to the cryogenic temperature to which the said element is subject in case of leakage. The device may further comprise an alarm device or indicator. "SME" means a shape memory effect.

By a "shape memory effect" (SME) element is meant an element of a material, having an elastic modulus which varies significantly with temperature in a reversible manner over a transition temperature range dependent on the material employed. Usually alloys are used. Such SME alloys are known as such to those skilled in the art and will not be described here in detail.

The present invention is based upon the fact that memory alloys having the shape memory effect change its shape quickly and massively if subject to a change in temperature. The said change in shape will occur if leakage of cryogenic material exists and the said change will activate a suitable alarm or indicator, so that it will be clear that the cryogenic material is leaking.

DESCRIPTION OF THE DRAWINGS

The invention will now be described by way of example in more detail in the accompanying drawings, in which.

DESCRIPTION OF PREFERRED EMBODIMENT

Figure 1:
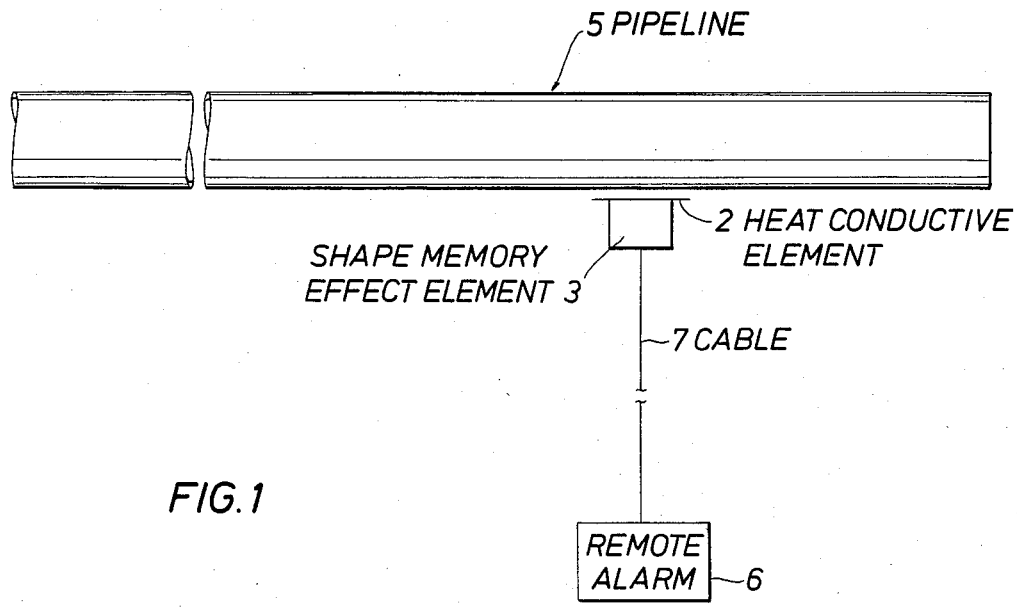
FIG. 1 represents schematically an example of an embodiment of a device according to the invention.

In FIG. 1, heat-conductive element 2 is brought into contact with structure 5 containing cryogenic material. In this example the structure 5 is a pipeline. The said element 2 is connected through any means suitable for the purpose to SME element 3. Said SME element 3 is connected to remote alarm 6 through any suitable means, for example cable 7, which activates the alarm mechanically.

If a leakage in the said structure 5 occurs, cryogenic material will fall onto the heat-conducting element 2. So, cold will pass to the SME element 3 which will change its shape quickly and massively. This change in shape will act on remote alarm 6 through mechanical flexible means 7, such as a Bowden cable.

Figure 2:
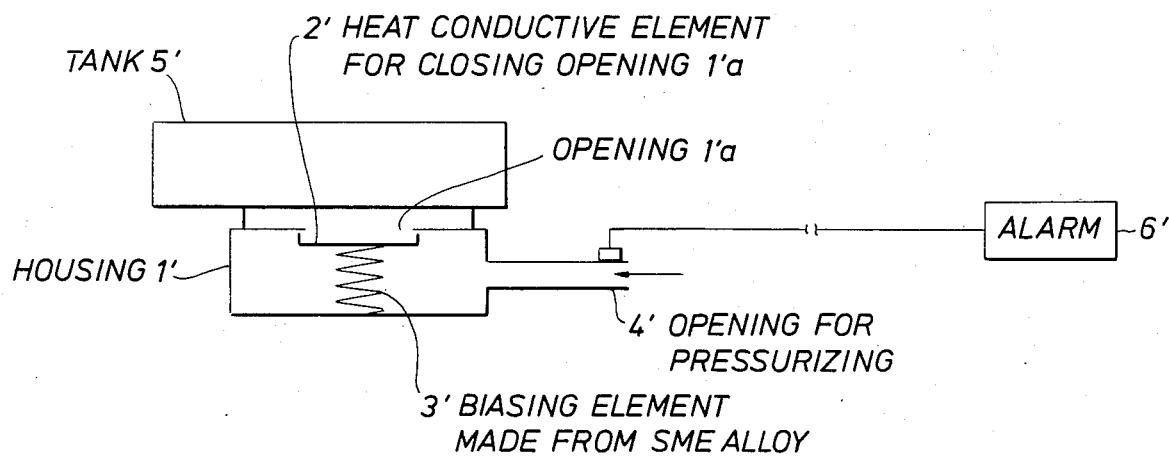
FIG. 2 represents schematically another example of an embodiment of the device according to the invention.

In FIG. 2 housing 1' is provided with opening 1'a which is directed toward structure 5' containing cryogenic material. In this example the structure 5' is a tank. The opening 1'a can be closed by heat-conductive element 2', by means of biasing element 3', made from a SME alloy. The housing 1' may be pressurized through opening 4' by any suitable fluid medium, for example air or inert gas. The opening 1'a of the housing 1' is brought into contact through any means suitable for the purpose with the cryogenic material-containing structure.

If a leakage in the said structure 5' occurs, cryogenic material will fall onto the heat-conducting element 2'. So, cold will pass to the SME element 3'. Said element 3' will change its shape quickly and massively, and in this way the element 2' will no longer close the opening 1'a. Subsequently, the pressure medium will escape round the element 2' and thus a suitable pressure signal can be obtained to activate alarm 6'. Any alarm suitable for the purpose may be used, for example a sound alarm or an indicating element.

It will be appreciated that the housing 1' and opening 1'a may have any suitable shape. The opening 1'a may, for example, have a round shape, so that the element 2' may be a disc. Further, an advantageous shape of the SME element is a bias element such as a spring and in particular a coiled spring. An advantageous material used for the heat-conductive element may, for example, be copper. Another suitable material is SME material.

It will be clear that any suitable connections between the SME element and the alarm are possible, for example a lever system or a hydraulic or pneumatic coupling.

It will be clear to those skilled in the art that any signal suitable for the purpose may be used to activate the alarm. For example, a pressure signal may be converted into an electric signal to activate an electronic alarm. Further any pressure medium suitable for the purpose may be used. If a device according to the invention is used on board tankers, the air to be used for the said alarm may be supplied from the ship's own air system. Further, it will be clear that the alarm device or indicator may be provided at the detecting device itself. In that case a remote alarm is not necessary.

Various modifications of the invention will become apparent to those skilled in the art from the foregoing description and accompanying drawings. Such modifications are intended to fall within the scope of the appended claims.

What is claimed is:

1. A device for detecting a leak of cryogenic material from a structure containing the material and triggering an alarm, the device comprising a heat-conductive element located to receive cryogenic material falling from the cryogenic material-containing structure, a biasing element made from a shape memory effect alloy which contacts the heat-conductive element and is operative to effect a displacement of the heat-conductive element according to the cryogenic temperature to which the biasing element is subjected, a housing provided with an opening which is closed in the absence of a leak of the cryogenic material onto the heat-conductive element, another opening in said housing for receiving pressurized fluid medium, and means for conveying a pressure drop signal from said housing to trigger an alarm.

* * * * *